United States Patent
Ichikawa et al.

(10) Patent No.: US 10,407,081 B2
(45) Date of Patent: Sep. 10, 2019

(54) HYBRID VEHICLE

(71) Applicant: TOYOTA JIDOSHA KABUSHIKI KAISHA, Toyota-shi, Aichi-ken (JP)

(72) Inventors: Shinji Ichikawa, Toyota (JP); Hiroaki Takeuchi, Toyota (JP); Ryuta Ishida, Okazaki (JP); Hiroaki Arakawa, Nagakute (JP); Shigeki Kinomura, Toyota (JP); Keita Hashimoto, Toyota (JP); Akio Uotani, Toyota (JP); Kazuyuki Kagawa, Toyota (JP); Yusuke Kinoshita, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 138 days.

(21) Appl. No.: 15/467,426

(22) Filed: Mar. 23, 2017

(65) Prior Publication Data

US 2017/0282931 A1    Oct. 5, 2017

(30) Foreign Application Priority Data

Mar. 30, 2016  (JP) .................................. 2016-069254

(51) Int. Cl.
*B60W 40/12*    (2012.01)
*B60W 20/13*    (2016.01)
(Continued)

(52) U.S. Cl.
CPC ............. *B60W 40/12* (2013.01); *B60L 50/10* (2019.02); *B60L 53/14* (2019.02); *B60L 58/12* (2019.02);
(Continued)

(58) Field of Classification Search
CPC ...... B60W 40/12; B60W 20/13; B60W 20/15; B60W 20/00; B60W 40/09; B60L 11/02
(Continued)

(56) References Cited

U.S. PATENT DOCUMENTS

| 9,371,766 B2 * | 6/2016 | Wang ...................... F01N 9/007 |
| 2008/0296908 A1 * | 12/2008 | Utsumi ................... F02D 29/02 |
| | | 290/40 C |

(Continued)

FOREIGN PATENT DOCUMENTS

| EP | 2 191 997 A1 | 6/2010 |
| JP | 8-19114 | 1/1996 |
| JP | 2009-126456 A | 6/2009 |

*Primary Examiner* — Thomas G Black
*Assistant Examiner* — Wae L Louie
(74) *Attorney, Agent, or Firm* — Finnegan, Henderson, Farabow, Garrett & Dunner, LLP (57) ABSTRACT

A utilization index IDX is calculated based on one or more parameters (the number of times of charging/the number of trips, total battery charger connection time/total vehicle stop time, total EV traveling distance/total HV traveling distance, total EV traveling time/total HV traveling time, total EV traveling distance/total traveling distance, total EV traveling time/total traveling time, total charge amount/total fuel supply quantity) obtained based on a ratio of an EV traveling utilization level to an HV traveling utilization level or a total traveling utilization level, and the utilization index IDX is stored. Since the utilization index IDX is calculated such that as each parameter is larger, utilization of charging of a battery by a battery charger is performed more sufficiently. Accordingly, the utilization index IDX can be used as an index that offers more accurate determination regarding a utilization status of the battery charging.

4 Claims, 7 Drawing Sheets

(51) Int. Cl.
*H02J 7/00* (2006.01)
*B60W 20/00* (2016.01)
*B60W 40/09* (2012.01)
*B60W 20/15* (2016.01)
*B60L 53/14* (2019.01)
*B60L 50/10* (2019.01)
*B60L 58/12* (2019.01)
*B60K 6/445* (2007.10)
*B60W 50/14* (2012.01)
*B60W 50/00* (2006.01)

(52) U.S. Cl.
CPC ............ *B60W 20/00* (2013.01); *B60W 20/13* (2016.01); *B60W 20/15* (2016.01); *B60W 40/09* (2013.01); *H02J 7/0021* (2013.01); *B60K 6/445* (2013.01); *B60W 50/14* (2013.01); *B60W 2050/0089* (2013.01); *B60W 2510/242* (2013.01); *B60W 2510/244* (2013.01); *B60W 2530/14* (2013.01); *B60W 2530/18* (2013.01); *B60W 2560/02* (2013.01); *Y02T 10/6239* (2013.01); *Y02T 10/6269* (2013.01); *Y02T 10/84* (2013.01); *Y10S 903/903* (2013.01)

(58) Field of Classification Search
USPC .......................................................... 701/22
See application file for complete search history.

(56) References Cited

U.S. PATENT DOCUMENTS

| | | | |
|---|---|---|---|
| 2009/0040033 A1* | 2/2009 | Uchida | B60L 58/12 340/439 |
| 2012/0112754 A1* | 5/2012 | Kawai | B60L 58/16 324/428 |
| 2012/0256599 A1* | 10/2012 | Gu | B60L 58/12 320/149 |
| 2014/0081490 A1 | 3/2014 | Adelman | |
| 2014/0203634 A1* | 7/2014 | Sugiyama | B60L 1/00 307/10.1 |
| 2017/0008509 A1* | 1/2017 | Sato | B60W 20/11 |
| 2017/0282740 A1* | 10/2017 | Ichikawa | B60L 53/14 |
| 2017/0282931 A1* | 10/2017 | Ichikawa | B60L 53/14 |

* cited by examiner

HYBRID VEHICLE

INCORPORATION BY REFERENCE

The disclosure of Japanese Patent Application No. 2016-069254 filed on Mar. 30, 2016 including the specification, drawings and abstract is incorporated herein by reference in its entirety.

BACKGROUND

1. Technical Field

The present disclosure relates to hybrid vehicles, and more particularly relates to a hybrid vehicle for which battery charging and fuel supply to a fuel tank are conducted.

2. Description of Related Art

Conventionally, as a hybrid vehicle of this type, there has been proposed a vehicle that restricts at least one output out of an output of an electric motor and an output of an internal combustion engine when change in a parameter, which corresponds to fuel consumption consumed by the internal combustion engine from the time of external charging of the battery, reaches a specified value (see, for example, Japanese Patent Application Publication No. 8-19114). In the hybrid vehicle, when change in the parameter reaches the specified value, at least one output out of the output of the electric motor and the output of the internal combustion engine is restricted so as to encourage a driver to conduct external charging and to promote traveling independent of the internal combustion engine. Accordingly, it becomes possible to sufficiently implement an effect of suppressing atmospheric contamination, which is an original purpose of the electric vehicles, while reserving a capacity of the internal combustion engine to allow traveling emergency situations.

SUMMARY

However, since the aforementioned hybrid vehicle uses the parameter corresponding to fuel consumption consumed by the internal combustion engine from the time of external charging of the battery, it is sometimes difficult to properly determine how much electric travel, which does not involve operation of the internal combustion engine, is being performed or how appropriately the external charging is being conducted.

The hybrid vehicle of the present disclosure provides an index that can offer more accurate determination regarding a utilization status of external charging.

A hybrid vehicle in a mode of the present disclosure includes an engine, a fuel tank configured to supply fuel to the engine, a motor, a battery configured to be able to supply electric power to the motor, a battery charger configured to charge the battery using an external power supply, and a control unit, in which the control unit is configured to calculate a utilization index of charging of the battery by the battery charger based on a ratio of an electric traveling utilization level to a hybrid traveling utilization level or a total traveling utilization level, and to store the calculated utilization index. The mode of the present disclosure may also be defined as below. A hybrid vehicle includes: an engine; a fuel tank configured to supply fuel to the engine; a motor; a battery configured to supply electric power to the motor; a battery charger configured to charge the battery using an external power supply; and an electronic control unit configured to i) calculate a utilization index of charging of the battery by the battery charger based on a ratio of an electric traveling utilization level to a hybrid traveling utilization level or a ratio of the electric traveling utilization level to a total traveling utilization level; and ii) store the calculated utilization index.

In the hybrid vehicle in the mode of the present disclosure, a utilization index of charging (external charging) of the battery by the battery charger is calculated based on a ratio of an electric traveling utilization level to a hybrid traveling utilization level or a total traveling utilization level, and the calculated utilization index is stored. That is, the utilization index is calculated based on the time and distance of electric traveling, the time and distance of hybrid traveling, and a ratio of the electric traveling utilization level to the hybrid traveling utilization level or a total traveling utilization level, the hybrid utilization level including the number of times of charging, a charge amount, the number of times of fuel supply, and an fuel supply quantity. Accordingly, the utilization index serves as an index that can offer more accurate determination regarding a utilization status of external charging. Such a utilization index is used for various processing performed to encourage external charging.

The electronic control unit may be configured to calculate the utilization index based on at least one of a) a ratio of the number of times that the battery charger charges the battery to the number of trips, b) a ratio of total time of connecting the battery charger to the external power supply to total vehicle stop time with a system of the vehicle being turned off; c) a ratio of a total electric traveling distance achieved without involving operation of the engine to a total hybrid traveling distance achieved involving operation of the engine, d) a ratio of total electric traveling time achieved without involving operation or the engine to total hybrid traveling time achieved involving operation of the engine, e) a ratio of the total electric traveling distance to the total traveling distance, e a ratio of the total electric traveling time to the total traveling time, g) a ratio of an integrated value of energy used to charge the battery by the battery charger to an integrated value of energy consumed for traveling, h) a ratio of an integrated value of energy consumed in the electric traveling to an integrated value of energy consumed in the hybrid traveling, i) a ratio of a total charge amount of the battery charged by the battery charger to a total fuel supply quantity to the fuel tank, j), a ratio of the total traveling distance to total emission of carbon dioxide. The utilization index may be calculated not only based on any one of the aforementioned ratios but also based on the plurality of ratios. It is also possible to directly use any one of the ratios as a utilization index.

When the utilization index is calculated based on a ratio of the number of times that the battery is charged by the battery charger to the number of trips, it becomes possible to provide an index that can offer more accurate determination regarding the utilization status of external charging with respect to the number of trips. When the utilization index is calculated based on a ratio of the total time of connecting the battery charger to the external power supply to the total vehicle stop time with the system being turned off, it becomes possible to provide an index that can offer more accurate determination regarding the utilization status of external charging during vehicle stop with the system being turned off. When the utilization index is calculated based on a ratio of the total electric traveling distance or time to the total hybrid traveling distance or time, the ratio becomes a ratio of the electric traveling to the hybrid traveling. Accordingly, it becomes possible to provide an index that can offer more accurate determination regarding the utilization status of the electric traveling, i.e., an index that can offer more accurate determination regarding the utilization status of the external charging. When the utilization index is calculated based on a ratio of the total electric traveling distance or time to the total traveling distance or time, it becomes possible to provide an index that can offer more accurate determination regarding the utilization status of the electric traveling in the traveling, i.e., an index that can offer more accurate determination regarding the utilization status of the external charging.

When the utilization index is calculated based on a ratio of an integrated value of energy used for charging the battery by the battery charger (an integrated value of energy for external charging) to an integrated value of energy consumed for traveling (an integrated value of energy consumption for traveling), the ratio becomes a ratio of an integrated value of energy used for external charging to the total energy taken for traveling. Accordingly, it becomes possible to provide an index that can offer more accurate determination regarding the utilization status of external charging. When the utilization index is calculated based on a ratio of an integrated value of energy consumed in electric traveling (an integrated value of energy for electric traveling) to an integrated value consumed in hybrid traveling (an integrated value of energy for hybrid traveling), the ratio becomes a ratio of the electric traveling to the hybrid traveling. Accordingly, it becomes possible to provide an index that can offer more accurate determination regarding the utilization status of the electric traveling, i.e., an index that can offer more accurate determination regarding the utilization status of external charging.

When the utilization index is calculated based on a ratio of the total charge amount of the battery charged by the battery charger to the total fuel supply quantity to the fuel tank, it becomes possible to consider the ratio as a ratio of the electric traveling to the hybrid traveling. Accordingly, it becomes possible to provide an index that can offer more accurate determination regarding the utilization status of the electric traveling in traveling, i.e., an index that can offer more accurate determination regarding the utilization status of the external charging. When the utilization index calculated based on a ratio of the total traveling distance to the total emission of the carbon dioxide, carbon-dioxide emission per traveling distance becomes larger in the traveling powered by fuel consumption than in the traveling powered by external charging. Accordingly, a reciprocal ratio, that is, a ratio of the total traveling distance to the total emission of the carbon dioxide, can be used as an index that can offer more accurate determination regarding the utilization status of the external charging.

The electronic control unit may be configured to calculate the utilization index based on at least one of c) the ratio of the total electric traveling distance to the total hybrid traveling distance, d) the ratio of the total electric traveling time to the total hybrid traveling time, e) the ratio of the total electric traveling distance to the total traveling distance, f) the ratio of the total electric traveling time to the total traveling time, and i) the ratio of the total charge amount of the battery charged by the battery charger to the total fuel supply quantity to the fuel tank such that influence of the vehicle utilization status on the utilization index is smaller in a trip with a large traveling distance than in a trip with a small traveling distance. In the trip with a large traveling distance, execution of electric traveling decreases the state of charge of the battery even with the battery being fully charged at the start of traveling. As a result, the electric traveling shifts to hybrid traveling, so that the distance and time of hybrid traveling increases. Therefore, the fuel consumption also increases, which causes increase in the fuel supply quantity to the fuel tank. Accordingly, if the utilization index in a trip with a large traveling distance is calculated in the same way as in a trip with a small traveling distance, the calculated utilization index ends up leading to the determination that the utilization status of external charging is low. In order to avoid such a situation to some extent or in entirety, the utilization index is calculated such that influence of the vehicle utilization status on the utilization index is smaller in a trip with a large traveling distance than in a trip with a small traveling distance. As a consequence, even when a special-case trip with a large traveling distance is performed, a more appropriate utilization index can be calculated. It is to be noted that cases signified by the phrase "the utilization index is calculated such that influence on the utilization index is smaller" includes the case of calculating the utilization index without any consideration to the trip with a large traveling distance."

The electronic control unit may be configured to calculate the utilization index based on at least one of a) the ratio of the number of times that the battery charger charges the battery to the number of trips, b) the ratio of the total time of connecting the battery charger to the external power supply to the total vehicle stop time with a system of the vehicle being turned off, such that influence of the vehicle utilization status on the utilization index is smaller in a case where a state of charge of the battery when the system is turned off is large than in a case where the state of charge of the battery when the system is turned off is small. When the state of charge of the battery when the system is turned off is large, battery charging by the battery charger is not performed, or if performed, the charging process is completed in a short time. Accordingly, if the utilization index is calculated in the same way as in the case where the state of charge of the battery when the system is turned off is small even though the state of charge of the battery when the system is turned off is large, the calculated utilization index ends up leading to the determination that the utilization status of charging is low. In order to avoid such a situation to some extent or in entirety, the utilization index is calculated such that influence of the vehicle utilization status on the utilization index is smaller in a case where the state of charge of the battery when the system is turned off is large, than in a case where the state of charge of the battery when the system is turned off is small. As a result, even when the state of charge of the battery when the system is turned off is large, a more appropriate utilization index can be calculated. It is to be noted that cases signified by the phrase "the utilization index is calculated such that influence on the utilization index is smaller" include the case of calculating the utilization index without any consideration to the case where the state of charge of the battery when the system is turned off is large.

The electronic control unit may be configured to calculate the utilization index based on the ratio of the number of times that the battery charger charges the battery to the number of trips, without counting the number of times that the battery charger is connected to the external power supply without change in the state of charge of the battery as the number of times that the battery charger charges the battery and without counting the number of times of trips without change in the state of charge of the battery as the number of trips. The connections of the battery charger to the external power supply that cause no change in the state of charge of the battery include a connection of the battery charger to the external power supply while the battery is fully charged and a connection of the battery charger to the external power supply immediately followed by cancel of the connection. The trips that cause no change in the state of charge of the battery include a trip in which the system is turned on (the system is started) and is then turned off (the system is stopped) without involving traveling. Accordingly, in these cases, the calculated utilization indexes end up leading to the determination that the charging utilization status is higher or lower than an actual charging utilization status. In order to avoid such a situation, the utilization index is calculated without counting the number of times that the battery charger is connected to the external power supply without change in the state of charge of the battery as the number of times that the battery charger charges the battery and without counting the number of times of trips without change in the state of charge of the battery as the number of trips. Accordingly, more appropriate utilization index can be calculated as compared with the case where the utilization index is calculated by counting connections of the battery charger to the external power supply that cause no change in the state of charge of the battery as the number of times of charging and by counting trips that cause no change in the state of charge of the battery as the number of trips.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENT

Figure 1:
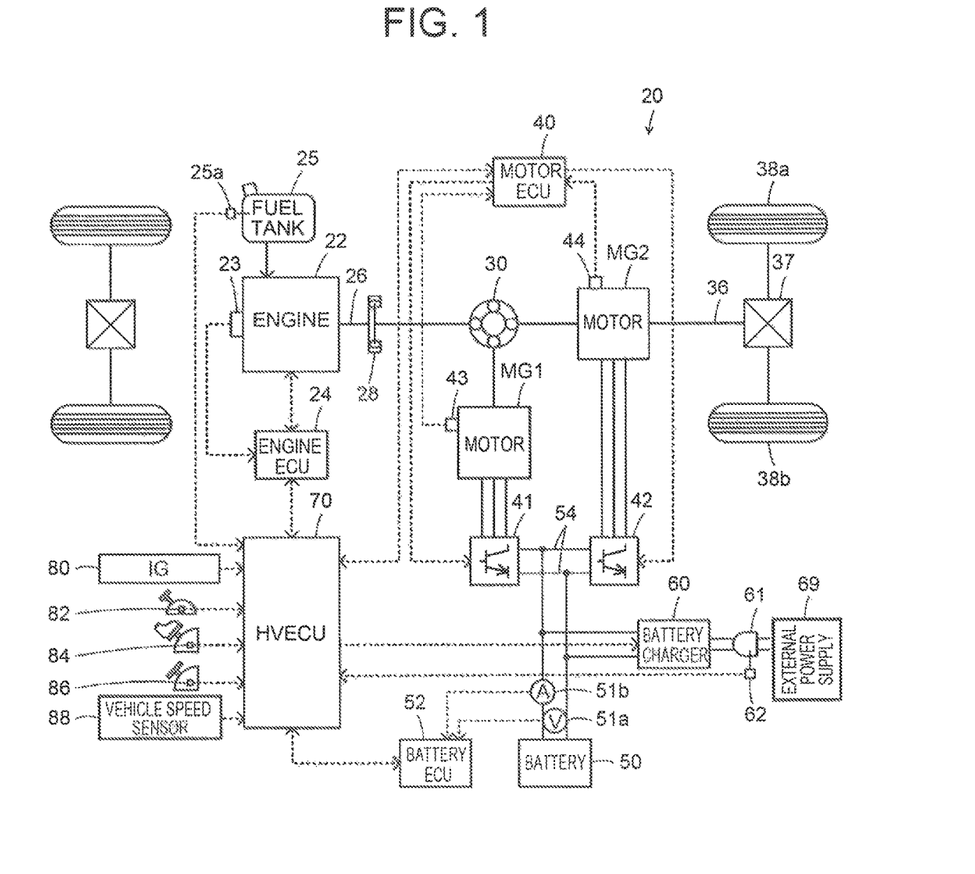
FIG. 1 is a block diagram illustrating an outlined configuration of a hybrid vehicle as an embodiment of the present disclosure.

Now, a mode for carrying out the present disclosure will be described based on an embodiment. FIG. 1 is a block diagram illustrating an outlined configuration of a hybrid vehicle 20 as an embodiment of the present disclosure. The hybrid vehicle 20 of the embodiment includes, as illustrated in the drawing, an engine 22, a planetary gear 30, motors MG1, MG2, inverters 41, 42, a battery 50, a battery charger 60, and a hybrid electronic control unit (hereinafter referred to as "HVECU") 70.

The engine 22 is configured as an internal combustion engine that outputs motive power by using fuel such as gasoline and gas oil from a fuel tank 25. The operation of the engine 22 is controlled by an engine electronic control unit (hereinafter referred to as "engine ECU") 24.

Although not illustrated, the engine ECU 24 is configured as a microprocessor having a CPU as a main component. The engine ECU 24 includes, in addition to the CPU, a ROM that stores processing programs, a RAM that temporarily stores data, input and output ports, and a communication port. The engine ECU 24 receives, through the input port, input of signals from various sensors needed for operation control of the engine 22, the signals including, for example, a crank angle $\theta cr$ from a crank position sensor 23 that detects a rotational position of a crankshaft 26 of the engine 22. The engine ECU 24 outputs various control signals for operation control of the engine 22 through the output port. The engine ECU 24 is connected with the HVECU 70 through the communication port. The engine ECU 24 calculates a speed Ne of the engine 22 based on the crank angle $\theta cr$ from the crank position sensor 23.

The planetary gear 30 is configured as a single pinion-type planetary gear mechanism. The planetary gear 30 has a sun gear connected to a rotator of the motor MG1. The planetary gear 30 has a ring gear connected to a driving shaft 36 coupled with a pair of driving wheels 38a, 38b through a differential gear 37. The planetary gear 30 has a carrier connected to the crankshaft 26 of the engine 22 through a damper 28.

The motor MG1, which is configured as a synchronous generator-motor for example, has a rotator connected to the sun gear of the planetary gear 30 as stated before. The motor MG2, which is configured as a synchronous generator-motor for example, has a rotator connected to the driving shaft 36. The inverters 41, 42 are connected with the battery 50 through an electric power line 54. The motors MG1, MG2 are rotationally driven when a motor electronic control unit (hereinafter referred to as "motor ECU") 40 performs switching control of a plurality of unillustrated switching elements of the inverters 41, 42.

Although not illustrated, the motor ECU 40 is configured as a microprocessor having a CPU as a main component. The motor ECU 40 includes, in addition to the CPU, a ROM that stores processing programs, a RAM that temporarily stores data, input and output ports, and a communication port. The motor ECU 40 receives, through the input port, input of signal from various sensors needed for controlling the operation of the motors MG1, MG2, the signals including, for example, rotational positions $\theta m1$, $\theta m2$ from rotational position detection sensors 43, 44 that detect rotational positions of the rotators of the motors MG1, MG2. The motor ECU 40 outputs, through the output port, signals such as a switching control signal to a plurality of unillustrated switching elements of the inverters 41, 42. The motor ECU 40 is connected with the HVECU 70 through the communication port. The motor ECU 40 calculates the numbers of rotations Nm1, Nm2 of the motors MG1, MG2 based on the rotational positions $\theta m1$, $\theta m2$ of the rotators of the motors MG1, MG2 from the rotational position detection sensors 43, 44.

The battery 50 is configured, for example, as a lithium-ion secondary battery or a nickel-hydrogen secondary battery. The battery 50 is connected with the inverters 41, 42 through the electric power line 54 as stated before. The battery 50 is managed by a battery electronic control unit thereinafter referred to as "battery ECU") 52.

Although not illustrated, the battery ECU 52 is configured as a microprocessor having a CPU as a main component. The battery ECU 52 includes, in addition to the CPU, a ROM that stores processing programs, a RAM that temporarily stores data, input and output ports, and a communication port. The battery ECU 52 receives input of signals from various sensors needed to manage the battery 50 through the input port. Examples of the signals include a battery voltage Vb from a voltage sensor 51a disposed between terminals of the battery 50, and a battery current Ib from a current sensor 51*b* attached to an output terminal of the battery 50. The battery ECU 52 is connected with the HVECU 70 through the communication port. The battery ECU 52 calculates a state of charge SOC based on an integrated value of the battery current Ib from the current sensor 51*b*. The state of charge SOC refers to a ratio of capacity of electric power dischargeable from the battery 50 to the total capacity of the battery 50.

The battery charger 60 is connected to the electric power line 54 and is configured as a battery that can perform external charging of the battery 50 with electric power from an external power supply 69, such as a household power supply and an industrial power supply, when a power supply plug 61 of the battery charger 60 is connected to the external power supply 69 at a charging point such as a residence and a charging station.

Although not illustrated, the HVECU 70 is configured as a microprocessor having a CPU as a main component. The HVECU 70 includes, in addition to the CPU, a ROM that stores processing programs, a RAM that temporarily stores data, a flash memory, input and output ports, and a communication port. The HVECU 70 receives signals from various sensors through the input port. Examples of the signals input into the HVECU 70 include an ignition signal from an ignition switch 80, a shift position SP from a shift position sensor 82, an accelerator opening Ace from an accelerator pedal position sensor 84, a brake pedal position BP from a brake pedal position sensor 86, and a vehicle speed V from a vehicle speed sensor 88. The examples of the signals also include a fuel quantity Qf from a fuel gauge 25*a* attached to the fuel tank 25, a connection signal SWC from a connection switch 62 attached to the power supply plug 61 so as to determine whether or not the power supply plug 61 is connected to the external power supply 69. The HVECU 70 outputs signals such as a control signal to the battery charger 60 through the output port. As described before, the HVECU 70 is connected with the engine ECU 24, the motor ECU 40, and the battery ECU 52 through the communication port. When oil is supplied to the fuel tank 25, the HVECU 70 calculates an fuel supply quantity Qin based on the fuel quantity Qf from the fuel gauge 25*a*.

In the thus-configured hybrid vehicle 20 of the embodiment, hybrid traveling (HV traveling) or electric traveling (EV traveling) is performed in a Charge Depleting (CD) mode or a Charge Sustaining (CS) mode. Here, the CD mode is a mode that prioritizes the EV traveling more than the CS mode. The HV traveling is a mode of traveling involving operation of the engine 22. The EV traveling is a mode of traveling without involving operation of the engine 22.

In the embodiment, the HVECU 70 controls the battery charger 60 such that the battery 50 is charged with electric power from the external power supply 69 when the power supply plug 61 is connected to the external power supply 69 while the vehicle is parked in a charging point such as a residence and a charging station with a system of the vehicle being turned off (the system being stopped). If the state of charge SOC of the battery 50 is larger than a threshold Shv1 (that is a value such as 45%, 50%, and 55%) when the system is turned on (the system is started), the vehicle travels in the CD mode until the state of charge SOC of the battery 50 reaches a thresholds Shv2 (that is a value such as 25%, 30%, and 35%) or less. After the state of charge SOC of the battery 50 reaches the threshold Shv2 or less, the vehicle travels in the CS mode until the system is turned off. When the state of charge SOC of the battery 50 is equal to or less than threshold Shv when the system is turned on, the vehicle travels in the CS mode until the system is turned off.

Figure 2:
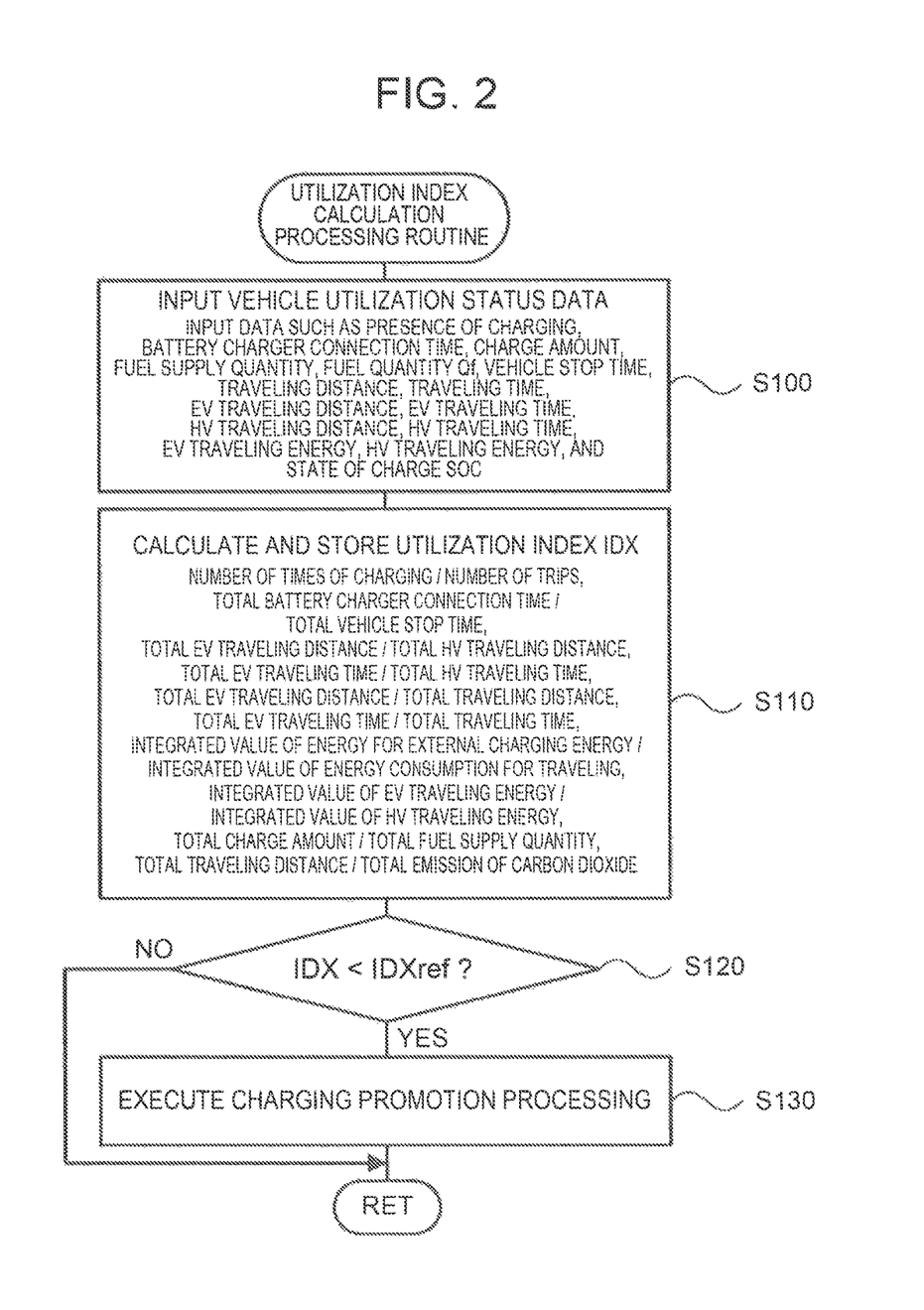
FIG. 2 is a flowchart illustrating one example of a utilization index calculation processing routine executed by an HVECU.

A description is now given of operation of the thus-configured hybrid vehicle 20 of the embodiment, and more particularly operation of calculating and storing a utilization index IDA of charging (external charging) of the battery 50 by the battery charger 60 based on a ratio of an EV traveling utilization level to an HV traveling utilization level or a total traveling utilization level. FIG. 2 is a flowchart illustrating one example of a utilization index calculation processing routine executed by the HVECU 70. The routine is executed in predetermined startup timing, such as when the system is turned on (started), when the system is turned off (stopped), when charging of the battery 50 is completed with the power supply plug 61 being connected to the external power supply 69, and when oil is supplied to the fuel tank 25. In the following description, the present routine is assumed to be executed when the system is turned on (started).

When the utilization index calculation processing routine is executed, the HVECU 70 first executes processing of inputting data that reflects a vehicle utilization status necessary to calculate a utilization index IDX in a predetermined plurality of trips (step S100). Since the HV traveling utilization level, the total traveling utilization level, and the EV traveling utilization level are based on the utilization status of the vehicle, the data reflecting the vehicle utilization status is input. The data reflecting the vehicle utilization status is defined as data from the time of turning on the system in a previous trip to the time of turning on the system in a present trip. Examples of the data include presence of charging of the battery 50 by the battery charger 60, charging time (battery charger connection time) with the power supply plug 61 of the battery charger 60 being connected to the external power supply 69, and a charge amount of the battery 50 by the battery charger 60. Examples of the data also include an fuel supply quantity, fuel quantity Qf, a vehicle stop time from the time of turning off the system in the previous trip to the time of turning on the system in the present trip, a traveling distance in the previous trip, and travel time of the previous trip. Examples of the data further include an EV traveling distance in the previous trip, EV traveling time in the previous trip, an HV traveling distance in the previous trip, and EV traveling time in the previous trip. Examples of the data also include energy consumed by EV traveling in the previous trip, the energy consumed by HV traveling in the previous trip, and the state of charge SOC. Here, "one trip" starts when the system of the hybrid vehicle 20 is turned on (started) and ends when the system is turned off (stopped).

The presence of charging of the battery 50 by the battery charger 60 may be determined by determining whether the power supply plug 61 is connected to the external power supply 69 based on a connection signal SWC from the connection switch 62 and by determining increase in the state of charge SOC of the battery 50. The charging time of connecting the power supply plug 61 of the battery charger 60 to the external power supply 69 (battery charger connection time) can be obtained by measuring the time of connecting the power supply plug 61 to the external power supply 69. The charge amount of the battery 50 charged by the battery charger 60 can be obtained by integrating the battery current Ib of the battery 50 while the power supply plug 61 is connected to the external power supply 69. The fuel supply quantity can be calculated based on values of the fuel gauge 25*a* before and after supply of oil to the fuel tank 25. The fuel quantity Qf may be detected with the fuel gauge 25*a*. The vehicle stop time from the time of turning off the system in the previous trip to the time of turning on the system in the present trip can be obtained by counting time from the time of turning off the system in the previous trip to the time of turning on the system in the present trip.

The traveling distance in the previous trip can be obtained by subtracting a traveling distance at the time of turning on the system in the previous trip from a traveling distance at the time of turning on the system in the present trip. The traveling time in the previous trip can be obtained by counting time from the time of turning on the system in the previous trip to the time of turning off the system in the previous trip. The EV traveling time in the previous trip can be obtained as a sum total of the EV traveling time in the previous trip. The EV traveling distance in the previous trip can be obtained as a sum total of the EV traveling distance in the previous trip. The EV traveling time in the previous trip can be obtained as a sum total of the HV traveling time in the previous trip. The HV traveling distance in the previous trip can be obtained as a sum total of the HV traveling distance in the previous trip. The energy consumed by the EV traveling in the previous trip can be obtained by time-integrating the result obtained by multiplying a vehicle weight M by a vehicle speed V during EV traveling ($\int M \cdot V dt$). The vehicle weight M may be measured with a vehicle weight sensor, or may be calculated based on a slope sensor and on torque and acceleration of the motor MG2, or may be predetermined. The energy consumed by the HV traveling in the previous trip can be obtained by time-integrating the result obtained by multiplying the vehicle weight M by the vehicle speed V during HV traveling ($\int M \cdot V dt$). The state of charge SOC may be calculated based on an integrated value of the battery current Ib from the current sensor 51b.

Once the data necessary to calculate the utilization index IDX is input, the utilization index IDX is calculated using the input data, and is stored in an unillustrated RAM or an unillustrated flash memory of the HVECU 70 (step S110). In the embodiment, the utilization index IDX is calculated based on one or more of the following parameters (1) to (10). As the respective parameters are larger, charging (external charging) of the battery 50 by the battery charger 60 is determined to be performed more sufficiently.

(1) Ratio of the Number of Times of Charging to the Number of Trips (the Number of Times of Charging/the Number of Trips)

The number of times of charging can be obtained by counting up the number based on the presence of charging of the battery 50 by the battery charger 60 input in step S100. The number of trips can be obtained by counting up the number whenever the system is turned on. It can be considered that the ratio of the number of times of charging to the number of trips reflects a ratio of the EV traveling utilization level to the total traveling utilization level. As the ratio is larger, utilization of charging of the battery 50 by the battery charger 60 can be determined to be promoted more. Accordingly, the ratio can be. 115 used as an index that can offer more accurate determination regarding the utilization status of the external charging.

(2) Ratio of Total Time of Connecting the Battery Charger 60 to the External Power Supply 69 to Total Time of Stopping the Vehicle with the System being Turned Off (Total Battery Charger Connection Link/Total Vehicle Stop Time)

The total time of connecting the battery charger 60 to the external power supply 69 can be obtained by integrating the charging time input in step S100 during which the power supply plug 61 of the battery charger 60 is connected to the external power supply 69. The total time of stopping the vehicle with the system being turned off (stop total time) can be obtained by integrating the vehicle stop time input in step S100, the vehicle stop time extending from the time of turning off the system in the previous trip to the time of turning on the system in the present trip. It can be considered that the ratio of the total time of connecting the battery charger 60 to the external power supply 69 to the total time of stopping the vehicle with the system being turned off serves as one factor that reflects the ratio of the EV traveling utilization level to the total traveling utilization level. As the ratio is larger, utilization of charging of the battery 50 by the battery charger 60 can be determined to be promoted more. Accordingly, the ratio can be used as an index that can offer more accurate determination regarding the utilization status of the external charging.

(3) Ratio of a Total EV Traveling Distance to a Total HV Traveling Distance (Total EV Traveling Distance/Total HV Traveling Distance)

The total EV traveling distance can be obtained by integrating the EV traveling distance in the previous trip input in step S100. The total HV traveling distance can be obtained by integrating the HV traveling distance in the previous trip input in step S100. The ratio of the total EV traveling distance to the total HV traveling distance can be considered as a ratio of the EV traveling utilization level to the HV traveling utilization level. As the ratio is larger, the ratio of the EV traveling becomes larger, so that utilization of charging of the battery 50 by the battery charger 60 can be determined to be promoted more. Accordingly, the ratio can be used as an index that can offer more accurate determination regarding the utilization status of the external charging.

(4) Ratio of Total EV Traveling Time to Total HV Traveling Time (Total EV Traveling Time/Total HV Traveling Time)

The total EV traveling time can be obtained by integrating the EV traveling time in the previous trip input in step S100. The total HV traveling time can be obtained by integrating the HV traveling time in the previous trip input in step S100. The ratio of the total EV traveling time to the total HV traveling time can be considered as a ratio of the EV traveling utilization level to the HV traveling utilization level. As the ratio is larger, the ratio of the EV traveling becomes larger, so that utilization of charging of the battery 50 by the battery charger 60 can be determined to be promoted more. Accordingly, the ratio can be used as an index that can offer more accurate determination regarding the utilization status of the external charging.

(5) Ratio of the Total EV Traveling Distance to the Total Traveling Distance (Total EV Traveling Distance/Total Traveling Distance)

The total traveling distance can be obtained by integrating the traveling distance in the previous trip input in step S100. It can be considered that the ratio of the total EV traveling distance to the total traveling distance reflects a ratio of the EV traveling utilization level to the total traveling utilization level. As the ratio is larger, the ratio of the EV traveling becomes larger, so that utilization of charging of the battery 50 by the battery charger 60 can be determined to be promoted more. Accordingly, the ratio can be used as an index that can offer more accurate determination regarding the utilization status of the external charging.

(6) Ratio of the Total EV Traveling Time to the Total Traveling Time (Total EV Traveling Time/Total Traveling Time)

The total traveling time can be obtained by integrating the traveling time in the previous trip input in step S100. It can be considered that the ratio of the total EV traveling time to the total traveling time reflects the ratio of the EV traveling utilization level to the total traveling utilization level. As the ratio is larger, the ratio of the EV traveling becomes larger, so that utilization of charging of the battery 50 by the battery charger 60 can be determined to be promoted more. Accordingly, the ratio can be used as an index that can offer more accurate determination regarding the utilization status of the external charging.

(7) Ratio of a Total Charge Amount of the Battery 50 Charged by the Battery Charger 60 to a Total Fuel Supply Quantity to the Fuel Tank 25 (Total Charge Amount/Total Fuel Supply Quantity)

The total charge amount of the battery 50 charged by the battery charger 60 can be obtained by integrating the charge amount of the battery 50 by the battery charger 60 input in step S100. The total fuel supply quantity to the fuel tank 25 can be obtained by integrating the fuel supply quantity input in step S100. The ratio of the total charge amount of battery 50 charged by battery charger 60 to the total fuel supply quantity to the fuel tank 25 can be considered to reflect the ratio of the EV traveling utilization level to the HV traveling utilization level. As the ratio is larger, charging of the battery 50 by the battery charger 60 is utilized more, so that utilization of charging of the battery 50 by the battery charger 60 can be determined to be promoted more. Accordingly, the ratio can be used as an index that can offer more accurate determination regarding the utilization status of the external charging.

(8) Ratio of an Integrated Value of Energy Used for Charging the Battery 50 with Electric Power from the External Power Supply 69 to an Integrated Value of Energy Consumed for Traveling (Integrated Value of Energy for External Charging/Integrated Value of Energy Consumption for Traveling)

The integrated value of energy used for charging the battery 50 with electric power from the external power supply 69 can be obtained by integrating the charge amount. The integrated value of energy consumed for traveling can be obtained as an integrated value of EV traveling energy, and an integrated value of HV traveling energy. It can be considered that the ratio of the integrated value of energy used for charging the battery 50 with electric power from external power supply 69 to the integrated value of energy consumed for traveling reflects the ratio of the EV traveling utilization level to the total traveling utilization level. As the ratio is larger, external charging is performed more, so that utilization of charging of the battery 50 by the battery charger 60 can be determined to be promoted more. Accordingly, the ratio can be used as an index that can offer more accurate determination regarding the utilization status of the external charging.

(9) Ratio of an Integrated Value of Energy Consumed for EV Traveling to an Integrated Value of Energy Consumed for HV Traveling (EV Traveling Energy Integrated Value/ HV Traveling Energy Integrated Value)

The integrated value of energy consumed for the EV traveling can be obtained by integrating the EV traveling energy. The integrated value of energy consumed for the HV traveling can be obtained by integrating the HV traveling energy. It can be determined that the ratio of the integrated value of energy consumed for EV traveling to the integrated value of energy consumed for HV traveling reflects the ratio of the EV traveling utilization level to the HV traveling utilization level. As the ratio is larger, EV traveling is performed more, so that utilization of charging of the battery 50 by the battery charger 60 can be determined to be promoted more. Accordingly, the ratio can be used as an index that can offer more accurate determination regarding the utilization status of the external charging.

(10) Ratio of the Total Traveling Distance to Total Emission of Carbon Dioxide (Total Traveling Distance/Total Emission of Carbon Dioxide)

The total emission of carbon dioxide can be calculated as a sum of the result obtained by multiplying the total fuel supply quantity by a fuel coefficient and the result obtained by multiplying the total charge amount by an external charging coefficient. It can be considered that the ratio of the total traveling distance to the total emission of carbon dioxide reflects the ratio of the EV traveling utilization level to the total traveling utilization level. Carbon-dioxide emission per traveling distance is larger during traveling by fuel consumption than traveling by external charging. Therefore, as the ratio is larger, traveling by external charging is performed more, so that utilization of charging of the battery 50 by the battery charger 60 can be determined to be promoted more. Accordingly, the ratio can be used as an index that can offer more accurate determination regarding the utilization status of the external charging.

Once the utilization index IDX is calculated and stored in this way, the utilization index IDX is compared with a threshold IDXref (step S120). When the utilization index IDX is equal to or more than the threshold IDXref, the utilization status of external charging is determined to be sufficient, and the present routine is ended. When the utilization index IDX is less than the threshold IDXref, it is determined that the utilization status of the external charging is not sufficient. Accordingly, some processing, such as notification processing and function restriction processing, is conducted (step S130) to encourage the external charging, the notification processing being configured fit perform notification such as announcement of a message "use external power supply to charge the vehicle" for example, the function restriction processing being configured to restrict the torque necessary for traveling and the like. Then, the present routine is ended.

In the hybrid vehicle 20 of the embodiment described in the foregoing, the utilization index IDX is calculated based on one or more of the aforementioned parameters (1) to (10) obtained based on the data reflecting the vehicle utilization status, and the calculated utilization index IDX is stored. Since the utilization index IDX is calculated such that as each parameter is larger, utilization of external charging is performed more sufficiently. Accordingly, the utilization index IDX can be used as an index that offers more accurate determination regarding the utilization status of external charging. As a result, various processing to promote external charging can be executed more appropriately.

In the hybrid vehicle 20 of the embodiment, the utilization index IDX is calculated based on one or more of the aforementioned parameters (1) to (10) obtained based on the data reflecting the vehicle utilization status. However, one of the parameters (1) to (10) may directly be used as the utilization index IDX.

In the case of using any one of the parameters including (3) the ratio of the total EV traveling distance to the total HV traveling distance, (4) the ratio of the total EV traveling time to the total HV traveling time, (5) the ratio of the total EV traveling distance to the total traveling distance, (6) the ratio of the total EV traveling time to the total traveling time, and (7) the ratio of the total charge amount of the battery 50 charged by the battery charger 60 to the total fuel supply quantity to the fuel tank 25 for calculation of the utilization index IDX, the following is preferably taken into consideration. In a trip with a large traveling distance or a traveling time, such as a trip with a traveling distance more than twice the EV traveling distance travelable with a fully-charged battery 50, and a trip with a traveling time taken for normally traveling the traveling distance more than twice the EV traveling distance, execution of the EV traveling decreases the state of charge SOC of the battery 50 even with the battery 50 being fully charged at the start of traveling. As a result, the EV traveling shifts to the HV traveling, so that the distance and time of the HV traveling increases. Therefore, the fuel consumption also increases, which also causes increase in the fuel supply quantity to the fuel tank 25. Accordingly, if the utilization index IDX is calculated based on any one of the parameters (3) to (7), which are calculated in the same way as in the case of a trip with a small traveling distance or with a short traveling time even though the trip has a long traveling distance or a long traveling time, the calculated utilization index IDX ends up leading to the determination that the utilization status of external charging is low. In order to avoid such inconvenience, it is preferable to decrease the influence of the traveling distance or the traveling time on the utilization index IDX in the trip with a large traveling distance or the trip with a long traveling time. In this case, in the calculation of the utilization index IDX in step S110 of the utilization index calculation processing routine in FIG. 2, calculation of the parameters (3) to (7) may be skipped to use previous calculation values, or other parameters may be used instead of the parameters (3) to (7).

Figure 3:
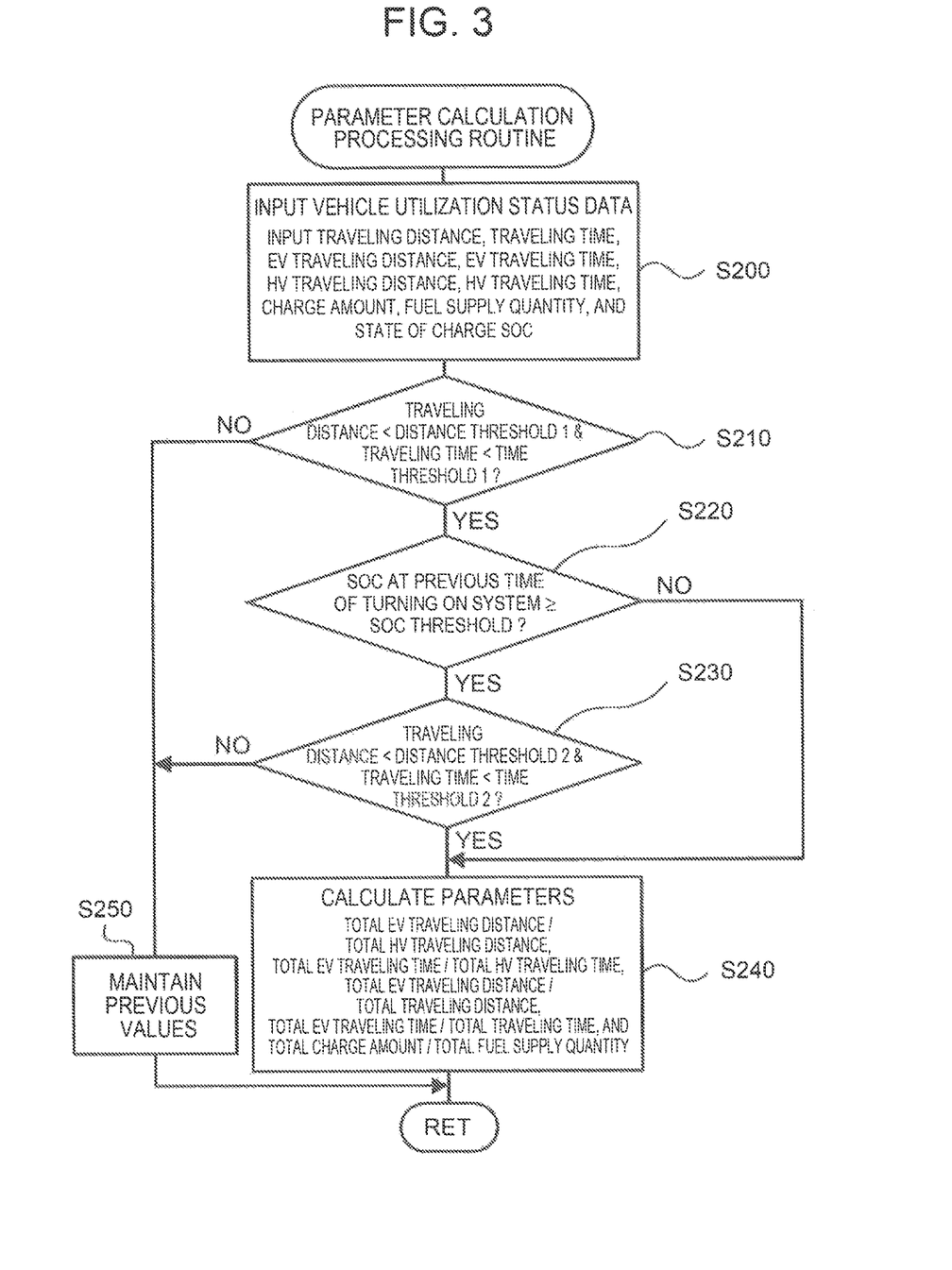
FIG. 3 is a flowchart illustrating one example of a calculation processing routine of parameters (3) to (7)

A parameter calculation processing routine illustrated in FIG. 3 may be used for parameter calculation in the case of maintaining the previous values. In the routine, first, the data inputting processing of the data same as that in step S100 of the utilization index calculation processing routine in FIG. 2 is performed (step S200). The input traveling distance is compared with a distance threshold 1, and the traveling time is compared with a time threshold 1 (step S210). Here, as the distance threshold 1, a traveling distance more than twice the EV traveling distance travelable with the fully-charged battery 50 may be used for example. As the time threshold 1, the time normally taken for traveling the traveling distance more than twice the EV traveling distance travelable with the fully-charged battery 50 may be used for example. When the traveling distance is equal to or more than the distance threshold 1 or when the traveling time is equal to more than the time threshold 1, previous values are maintained (step S250) without calculation of the respective parameters (3) to (7), and the present routine is ended. That is, calculation of the respective parameters (3) to (7) is skipped. Thus, when the traveling distance is equal to or more than the distance threshold 1 or when the traveling time is equal to more than the time threshold 1, calculation of the respective parameters (3) to (7) is skipped. Accordingly, it becomes possible to avoid inconvenience caused by calculating the respective parameters (3) to (7) using the vehicle utilization status data of a trip with a large traveling distance or a trip with a long traveling time. As a consequence, even in the case of a trip with a large traveling distance or a trip with a long traveling time, a more appropriate utilization index IDX can be calculated.

Meanwhile, when the traveling distance is less than the distance threshold 1 and the traveling time is less than the time threshold 1, then it is determined whether or not the state of charge SOC at the time of turning on the system in the previous trip is equal to or more than a SOC threshold (step S220). Here, the SOC threshold is to indicate that the battery 50 is charged to some extent before the previous trip. For example, the SOC threshold may be a value such as 50% and 60%. When the state of charge SOC at the time of turning on the system in the previous trip is less than the SOC threshold, the respective parameters (3) to (7) are calculated as described in step S110 of the utilization index calculation processing routine in FIG. 2 (step S240), and the present routine is ended. Meanwhile, when the state of charge SOC at the time of turning on the system in the previous trip is equal to or more than the SOC threshold, the traveling distance is compared with a distance threshold 2 that is smaller than the distance threshold 1, and the traveling time is compared with a time threshold 2 that is smaller than the time threshold 1 (step S230). When the traveling distance is equal to or more than the distance threshold 2 or when the traveling time is equal to or more than the time threshold 2, previous values are maintained (step S250) without calculation of the respective parameters (3) to (7), and the present routine is ended. When the state of charge SOC at the time of turning on the system in the previous trip is equal to or more than the SOC threshold, it indicates that charging was conducted before the previous trip. Accordingly, the above steps are performed to avoid, to some extent, the situation where the utilization index IDX leads to the determination that the utilization status of charging of the battery 50 by the battery charger 60 is low.

When the traveling distance is less than the traveling threshold 2 and the traveling time is less than the time threshold 2, the respective parameters (3) to (7) are calculated as described in step S110 of the utilization index calculation processing routine in FIG. 2 (step S240), and the present routine is ended. In the parameter calculation processing routine of FIG. 3, when the traveling distance in the previous trip is equal to or more than the distance threshold 1, when the traveling time is equal to or more than traveling time threshold 1, or when the state of charge SOC at the time of turning on the system in the previous trip is equal to or more than the SOC threshold and the traveling distance in the previous trip is equal to or more than the distance threshold 2 or the traveling time is equal to or more than the time threshold 2, calculation of the respective parameters (3) to (7) is skipped. However, calculation of the respective parameters (3) to (7) may be performed by multiplying the HV traveling distance, the HV traveling time, the traveling distance, and the traveling time by a coefficient smaller than the value 1, the coefficient becoming smaller as the traveling distance is larger, or the traveling time becoming longer.

In the case of using any one of the parameters including (1) the ratio of the number of times of charging to the number of trips and 2) the ratio of the total time of connecting the battery charger 60 to the external power supply 69 to the total time of stopping the vehicle with the system being turned off, the following is preferably be taken into consideration. When the state of charge of the battery 50 at the time of turning off the system in the previous trip is large, charging of the battery 50 by the battery charger 60 is not performed, or if performed, the charging process is completed in a short time. Accordingly, if the utilization index IDX is calculated based on any one of the parameters (1) and (2), which are calculated in the same way as in the case where the state of charge SOC of the battery 50 at the time of turning off the system in the previous trip is large, even when the state of charge SOC of the battery 50 at the time of turning off the system in the previous trip is small, the calculated utilization index IDX ends up leading to the determination that the utilization status of external charging is low. In order to avoid such inconvenience, it is preferable to decrease the influence of charging or battery charger connection time on the utilization index IDX when the state of charge SOC of the battery 50 at the time of turning off the system is large. Also in this case, in the calculation of the utilization index IDX in step S110 of the utilization index calculation processing routine in FIG. 2, calculation of the parameters (1) and (2) may be skipped to use previous calculation values, or other parameters may be used instead of the parameters of (1) and (2).

Figure 4:
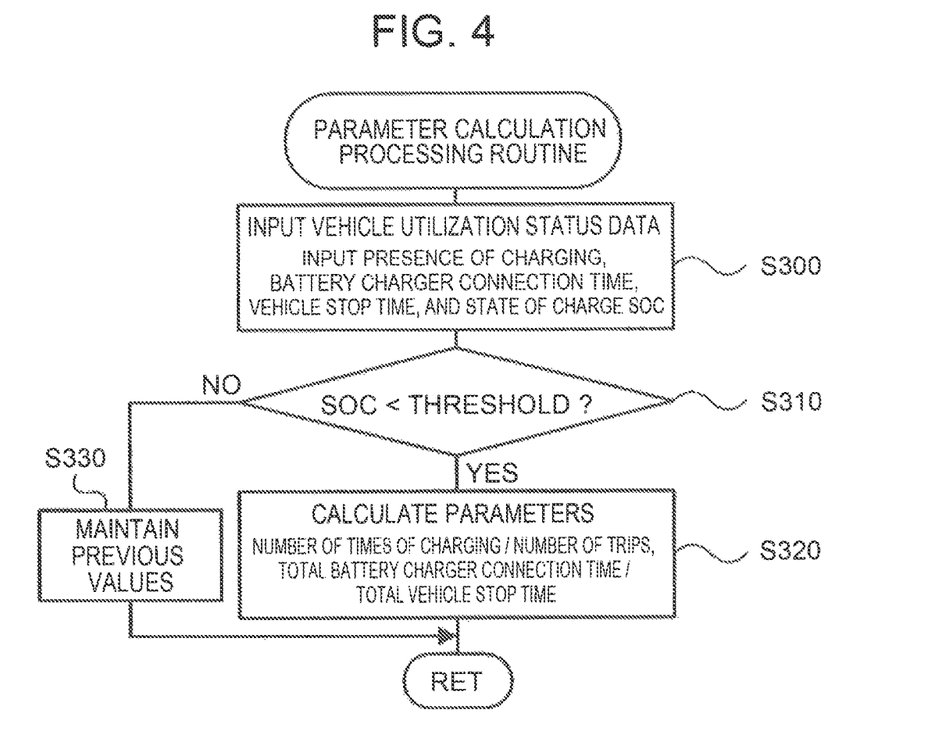
FIG. 4 is a flowchart illustrating one example of a calculation processing routine of parameters (1) and (2)

A parameter calculation processing routine illustrated in FIG. 4 may be used for parameter calculation in the case of maintaining the previous values. In the routine, first, the data inputting processing of the data same as that in step S100 of the utilization index calculation processing routine in FIG. 2 is performed (step S300). The state of charge SOC of the battery 50 at the time of turning off the system in the previous trip is compared with a threshold (step S310). Here, the state of charge SOC of the battery 50 at the time of turning off the system in the previous trip is calculated based on an integrated value of the battery current Ib from the battery ECU 52 at the time of turning off the system in the previous trip. The battery ECU 52 inputs and stores the calculated SOC in an unillustrated RAM through the through communication, so that the calculated SOC can be obtained by reading the calculated SOC from the RAM. As the threshold, values in the vicinity of full-charge of the battery 50, such as 90% and 85%, can be used, for example.

When the state of charge SOC of the battery 50 is less than the threshold, the respective parameters (1) and (2) are calculated as described in step S110 of the utilization index calculation processing routine in FIG. 2 (step S320), and the present routine is ended. When the state of charge SOC is equal to or more than the threshold, previous values are maintained (step S330) without calculation of the respective parameters (1) and (2), and the present routine is ended. That is, calculation of the respective parameters (1) and (2) is skipped. Thus, when the state of charge SOC of the battery 50 at the time of turning off the system in the previous trip is equal to or more than the threshold, calculation of the respective parameters (1) and (2) is skipped. Accordingly, it becomes possible to avoid the inconvenience caused by turning off the system while the state of charge SOC of the battery 50 is large. As a result, even when the state of charge SOC of the battery 50 at the time of turning off the system in the previous trip is large, a more appropriate utilization index IDX can be calculated. In the parameter calculation processing routine of FIG. 4, calculation of the respective parameters (1) and (2) is skipped when the state of charge SOC of the battery 50 at the time of turning off the system in the previous trip is equal to or more than the threshold. However, the respective parameters (1) and (2) may be calculated by multiplying a coefficient smaller than the value 1, the coefficient becoming smaller as a count value of the number of trips or the vehicle stop time becoming larger.

In the case of using the parameter that is (1) the ratio of the number of times of charging to the number of trips for the calculation of the utilization index IDX, the following is preferably taken into consideration. A connection of the power supply plug 61 of the battery charger 60 with the external power supply 69 without causing change in the state of charge SOC of the battery 50 or a trip without causing change in the state of charge SOC of the battery 50 may cause the inconvenience of calculating the utilization index IDX that leads to determination that the utilization status of external charging is higher or lower than the actual utilization status. Here, the connection of the power supply plug 61 of the battery charger 60 with the external power supply 69 without causing change in the state of charge SOC of the battery 50 includes connection of the power supply plug 61 to the battery 50 while the external power supply 69 is in a full-charge state, and connection of the power supply plug 61 of the battery charger 60 to the external power supply 69 immediately followed by cancel of the connection. The trip without causing change in the state of charge SOC of the battery 50 includes a trip in which the system is turned on (the system is started) but is then turned off (the system is stopped) without involving traveling. In order to avoid such inconvenience, in the case of the connection of the power supply plug 61 of the battery charger 60 with the external power supply 69 without causing change in the state of charge SOC of the battery 50 or the trip without causing change in the state of charge SOC of the battery 50, it is preferable to calculate the utilization index IDX, without counting up the number of times of charging and the number of trips. Also in this case, in the calculation of the utilization index IDX in step S110 of the utilization index calculation processing routine in FIG. 2, calculation of the parameter (1) may be skipped to use a previous calculation value, or another parameter may be used instead of the parameter (1).

Figure 5:
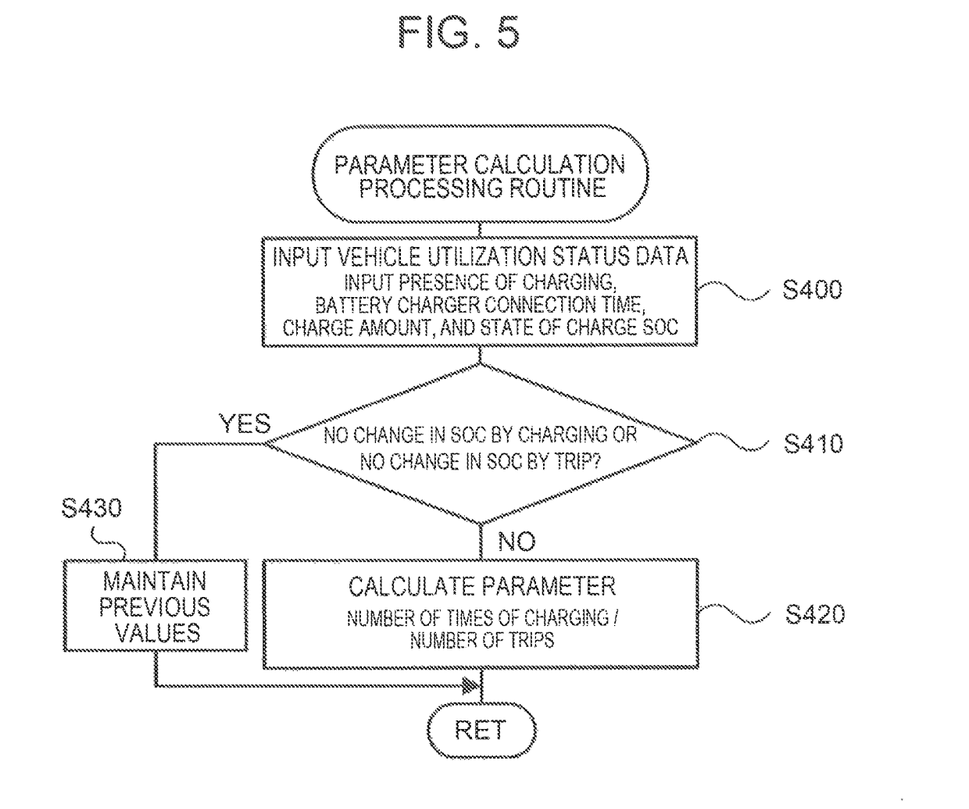
FIG. 5 is a flowchart illustrating one example of a calculation processing routine of the parameter (1)

A parameter calculation processing routine illustrated in FIG. 5 may be used for parameter calculation in the case of maintaining the previous value. In the routine, first, the data inputting processing of the data same as that in step S100 of the utilization index calculation processing routine in FIG. 2 is performed (step S400). It is determined whether or not the state of charge SOC of the battery 50 has been changed by charging performed from the time of turning off the system in the previous trip to the time of turning on the system in the present trip and whether or not the state of charge SOC Of the battery 50 has been changed by the previous trip (step S410). Here, whether or not the state of charge SOC of the battery 50 has been changed by charging may be determined based on whether or not the charge amount is equal to or more than a threshold or whether or not charger connection time is equal to or more than a threshold. Whether or not the state of charge SOC of the battery 50 has been changed by the previous trip may be determined based on the state of charge SOC at the time of turning on the system in the previous trip and the state of charge SOC at the time of turning off the system.

When the state of charge SOC of the battery 50 has been changed by charging, or when the state of charge SOC of the battery 50 has been changed by the previous trip, the parameter (1) is calculated as described in step S110 of the utilization index calculation processing routine in FIG. 2 (step S420), and the present routine is ended. Meanwhile, when the state of charge SOC of the battery 50 has not been changed by charging, or when the state of charge SOC of the battery 50 has not been changed by the previous trip, a previous value is maintained (step S430) without calculation of the parameter (1), and the present routine is ended. That is, calculation of the parameter (1) is skipped. By skipping the calculation of the parameter (1) in this way when the state of charge SOC of the battery 50 has not been changed by charging, or when the state of charge SOC of the battery 50 has not been changed by the previous trip, it becomes possible to avoid the inconvenience of calculating the utilization index IDX that leads to determination that the utilization status of charging is higher or lower than the actual utilization status. Accordingly, even when the case where the state of charge SOC of the battery 50 has not been changed by charging, or the case where the state of charge SOC of the battery 50 has not been changed by the previous trip occur, more appropriate utilization index IDX can be calculated.

In the case of using the parameter that is (1) the ratio of the number of times of charging to the number of trips for the calculation of the utilization index IDX, the following is preferably taken into consideration. When the traveling distance and traveling time in the previous trip are small, the inconvenience of calculating the utilization index IDX that leads to determination that the utilization status of external charging is higher or lower than the actual utilization status may occur. In order to avoid such inconvenience, when the traveling distance and traveling time of the previous trip are small, it is preferable to calculate the utilization index IDX, without counting up the number of times of charging and the number of trips. Also in this case, in the calculation of the utilization index IDX in step S110 of the utilization index calculation processing routine in FIG. 2, calculation of the parameter (1) may be skipped to use a previous calculation value, or another parameter may be used instead of the parameter (1).

Figure 6:
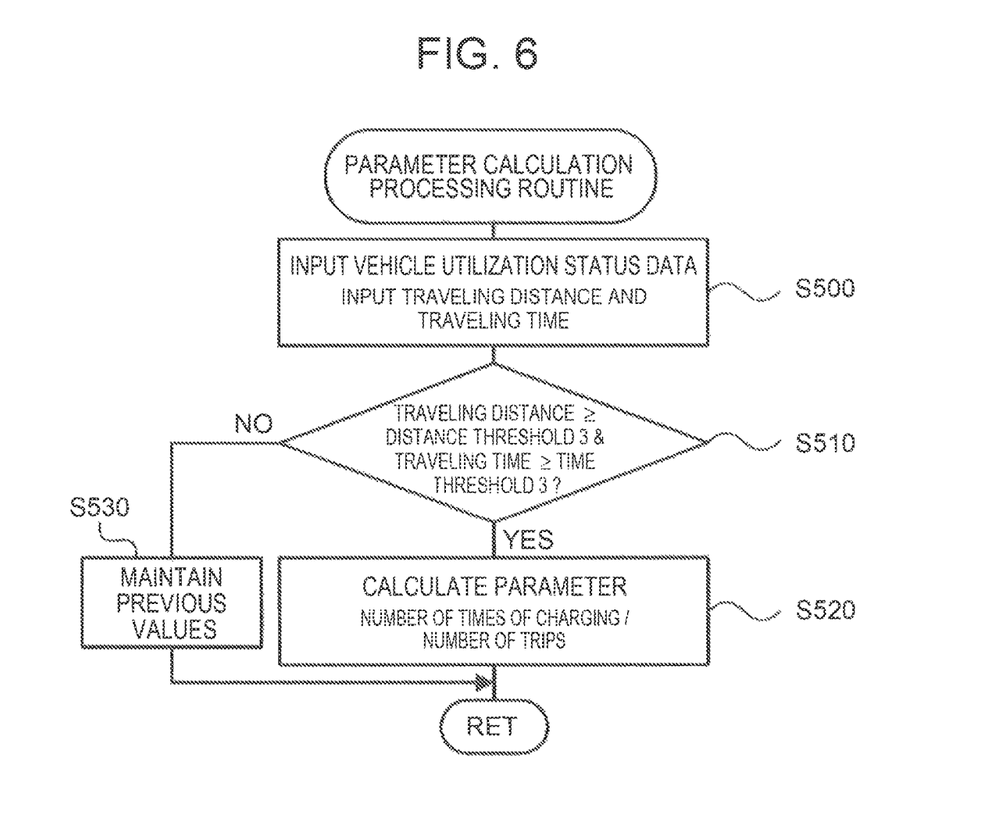
FIG. 6 is a flowchart illustrating one example of the calculation processing routine of the parameter (1)

A parameter calculation processing routine illustrated in FIG. 6 may be used for parameter calculation in the case of maintaining the previous value. In the routine, first, the data inputting processing of the data same as that in step S100 of the utilization index calculation processing routine in FIG. 2 is performed (step S500). The traveling distance in the previous trip is compared with a distance threshold 3, and the traveling time is compared with a time threshold 3 (step S510). Here, the distance threshold 3 may be a small distance, such as 1 km and 3 km. The time threshold 3 may be a short time such as 3 minutes and 5 minutes. When the traveling distance in the previous trip is equal to or more than the traveling threshold 3 and the traveling time is equal to or more than the time threshold 3, the parameter (1) is calculated as described in step S110 of the utilization index calculation processing routine in FIG. 2 (step S520), and the present routine is ended. Meanwhile, when the traveling distance in the previous trip is less than the traveling threshold 3 or the traveling time is less than the time threshold 3, the previous value is maintained (step S530) without calculation of the parameter (1), and the present routine is ended. That is, calculation of the parameter (1) is skipped. By skipping calculation of the parameter (1) in this way when the traveling distance and the traveling time in the previous trip is short, it becomes possible to avoid the inconvenience of calculating the utilization index IDX that leads to determination that the utilization status of charging is higher or lower than the actual utilization status. Accordingly, even when the case where the traveling distance and traveling time in the previous trip are short occurs, more appropriate utilization index IDX can be calculated.

The hybrid vehicle 20 of the embodiment includes the battery charger 60 that charges the battery 50 with the power supply plug 61 being connected to the external power supply 69. However, the hybrid vehicle 20 may include a battery charger that charges the battery 50 by receiving electric power from the external power supply 69 in a non-contact manner.

Figure 7:
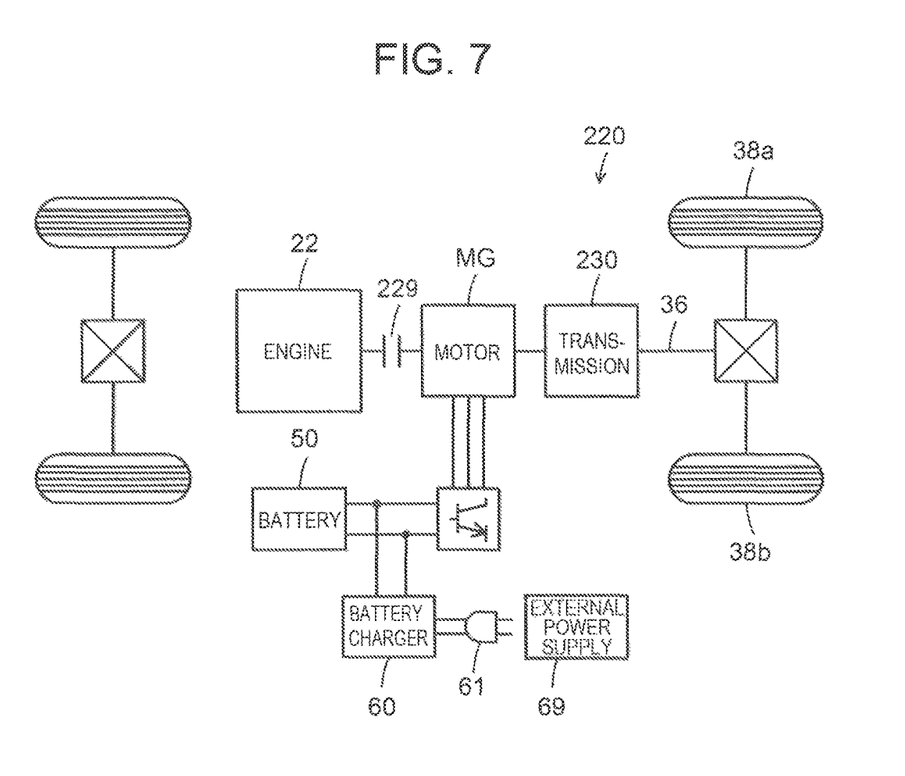
FIG. 7 is a block diagram illustrating an outlined configuration of a hybrid vehicle in a modification.

The hybrid vehicle 20 of the embodiment is configured such that the engine 22, the motor MG1, and the driving shaft 36 are connected to the planetary gear 30, and the driving shaft 36 is connected to the motor MG2. Like a hybrid vehicle 220 in a modification illustrated in FIG. 7, the present disclosure may be configured such that a driving shaft 36 coupled with driving wheels 38a, 38b is connected to a motor MG through a transmission 230, and a rotating shaft of the motor MG is connected to an engine 22 through a clutch 229, so that motive power from the engine 22 is output to the driving shaft 36 through the rotating shaft of the motor MG and the transmission 230, and motive power from the motor MG is output to the driving shaft through the transmission 230. The present disclosure may also be configured as a so-called series hybrid vehicle. That is, the present disclosure may be a hybrid vehicle of any configuration as long as the hybrid vehicle includes an engine, a motor, a battery, and a battery charger connected to an external power supply so as to charge the battery.

Correspondence relation between the main elements of the embodiment and the main elements of the present disclosure described in Summary will be described. In the embodiment, the engine 22 corresponds to "the engine", the fuel tank 25 corresponds to "the fuel tank", the motor MG2 corresponds to "the motor", the battery 50 corresponds to "the battery", the battery charger 60 corresponds to "the battery charger", and the HVECU 70 that executes the utilization index calculation processing routine in FIG. 2 corresponds to "the control unit".

Since the embodiment is one example for specific description of the mode for carrying out the present disclosure described in Summary, the correspondence relation between the main elements of the embodiment and the main elements of the present disclosure described in Summary is not intended to limit the elements of the disclosure described in Summary. More specifically, the disclosure disclosed in Summary should be interpreted based on the description therein, and the embodiment is merely a specific example of the disclosure disclosed in Summary.

Although the mode for carrying out the present disclosure has been described using the embodiment, the present disclosure is not limited in any manner to the embodiment disclosed. It should naturally be understood that the present disclosure can be carried out in various modes without departing from the scope of the present disclosure.

The present disclosure is applicable in the fields such as manufacturing of the hybrid vehicle.

What is claimed is:
1. A hybrid vehicle comprising:
an engine;
a fuel tank configured to supply fuel to the engine;
a motor;
a battery configured to supply electric power to the motor;
a battery charger configured to charge the battery using an external power supply; and
an electronic control unit configured to
i) calculate a utilization index of charging of the battery by the battery charger based on a ratio of an electric traveling utilization level to a hybrid traveling utilization level or a ratio of the electric traveling utilization level to a total traveling utilization level; and
ii) store the calculated utilization index, wherein
the electronic control unit is configured to calculate the utilization index based on at least one of
a) a ratio of the number of times that the battery charger charges the battery to the number of trips,
b) a ratio of total time of connecting the battery charger to the external power supply to total vehicle stop time with a system of the vehicle being turned off,
c) a ratio of a total electric traveling distance achieved without involving operation of the engine to a total hybrid traveling distance achieved involving operation of the engine,
d) a ratio of total electric traveling time achieved without involving operation of the engine to total hybrid traveling time achieved involving operation of the engine,
e) a ratio of the total electric traveling distance to a total traveling distance, f) a ratio of the total electric traveling time to total traveling time,
g) a ratio of an integrated value of energy used to charge the battery by the battery charger to an integrated value of energy consumed for traveling,
h) a ratio of an integrated value of energy consumed in the electric traveling to an integrated value of energy consumed in the hybrid traveling,
i) a ratio of a total charge amount of the battery charged by the battery charger to a total fuel supply quantity to the fuel tank, and
j) a ratio of the total traveling distance to total emission of carbon dioxide.

2. The hybrid vehicle according to claim 1, wherein
the electronic control unit is configured to calculate the utilization index such that influence of the vehicle utilization status on the utilization index is smaller in a trip with a large traveling distance than in a trip with a small traveling distance, based on at least one of
c) the ratio of the total electric traveling distance to the total hybrid traveling distance,
d) the ratio of the total electric traveling time to the total hybrid traveling time,
e) the ratio of the total electric traveling distance to the total traveling distance,
f) the ratio of the total electric traveling time to the total traveling time, and
i) the ratio of the total charge amount of the battery charged by the battery charger to the total fuel supply quantity to the fuel tank.

3. The hybrid vehicle according to claim 1, wherein
the electronic control unit is configured to calculate the utilization index such that influence of the vehicle utilization status on the utilization index is smaller in a case where a state of charge of the battery when the system is turned off is large than in a case where the state of charge of the battery when the system is turned off is small, based on at least one of
a) the ratio of the number of times that the battery charger charges the battery to the number of trips, and
b) the ratio of the total time of connecting the battery charger to the external power supply to the total vehicle stop time with a system of the vehicle being turned off.

4. The hybrid vehicle according to claim 1, wherein
the electronic control unit is configured to
calculate the utilization index based on the ratio of the number of times that the battery charger charges the battery to the number of trips,
without counting the number of times that the battery charger is connected to the external power supply without change in the state of charge of the battery as the number of times that the battery charger charges the battery, and
without counting the number of times of trips without change in the state of charge of the battery as the number of trips.

* * * * *